United States Patent
Waibel

(10) Patent No.: US 8,814,972 B2
(45) Date of Patent: Aug. 26, 2014

(54) MULTI-LAYERED FILTER WEB

(75) Inventor: Hans Waibel, Remseck/Aldingen (DE)

(73) Assignee: Mahle International GmbH (DE)

( * ) Notice: Subject to any disclaimer, the term of this patent is extended or adjusted under 35 U.S.C. 154(b) by 715 days.

(21) Appl. No.: 12/999,709

(22) PCT Filed: Jun. 12, 2009

(86) PCT No.: PCT/EP2009/057275
§ 371 (c)(1),
(2), (4) Date: Apr. 11, 2011

(87) PCT Pub. No.: WO2009/153216
PCT Pub. Date: Dec. 23, 2009

(65) Prior Publication Data
US 2011/0173938 A1    Jul. 21, 2011

(30) Foreign Application Priority Data
Jun. 20, 2008    (DE) .......................... 10 2008 029 480

(51) Int. Cl.
*B01D 46/00*    (2006.01)

(52) U.S. Cl.
USPC ................ 55/486; 156/73.1; 55/520; 55/521; 55/524; 55/DIG. 5

(58) Field of Classification Search
USPC .................. 55/490–519, 521; 210/483–499; 156/73.1–73.4; 95/273–287
See application file for complete search history.

(56) References Cited

U.S. PATENT DOCUMENTS

| 4,427,485 A | * | 1/1984 | Kutnyak et al. ............... 156/429 |
| 5,181,946 A | * | 1/1993 | Bosses et al. .................... 55/381 |
| 5,512,172 A | * | 4/1996 | Marble ......................... 210/232 |
| 5,607,735 A | * | 3/1997 | Brown ......................... 428/36.1 |
| 2002/0096247 A1 | * | 7/2002 | Wydeven ...................... 156/210 |
| 2003/0159415 A1 | * | 8/2003 | Parker ............................. 55/481 |
| 2005/0206038 A1 | * | 9/2005 | Brisebois et al. ............. 264/284 |
| 2006/0236664 A1 |  | 10/2006 | Stahl et al. |
| 2007/0137157 A1 | * | 6/2007 | Linhart et al. .................. 55/486 |

FOREIGN PATENT DOCUMENTS

| DE | 202005019910 U1 | 4/2007 |
| DE | 102006034640 A1 | 1/2008 |
| EP | 1716905 A1 | 11/2006 |
| WO | WO-2007/035802 A1 | 3/2007 |

OTHER PUBLICATIONS

English abstract for DE-102006034640, Jan. 31, 2008.

* cited by examiner

*Primary Examiner* — Duane Smith
*Assistant Examiner* — Thomas McKenzie
(74) *Attorney, Agent, or Firm* — Rader, Fishman & Grauer PLLC

(57) ABSTRACT

A multi-layered filter web having at least one at least one filter layer bonded to at least one additional filter layer. The filter layers are bonded together by at least one of ultrasonically and matted. The bonding is in at least one of at least one knurled edge region and in at least one matting region.

11 Claims, 1 Drawing Sheet

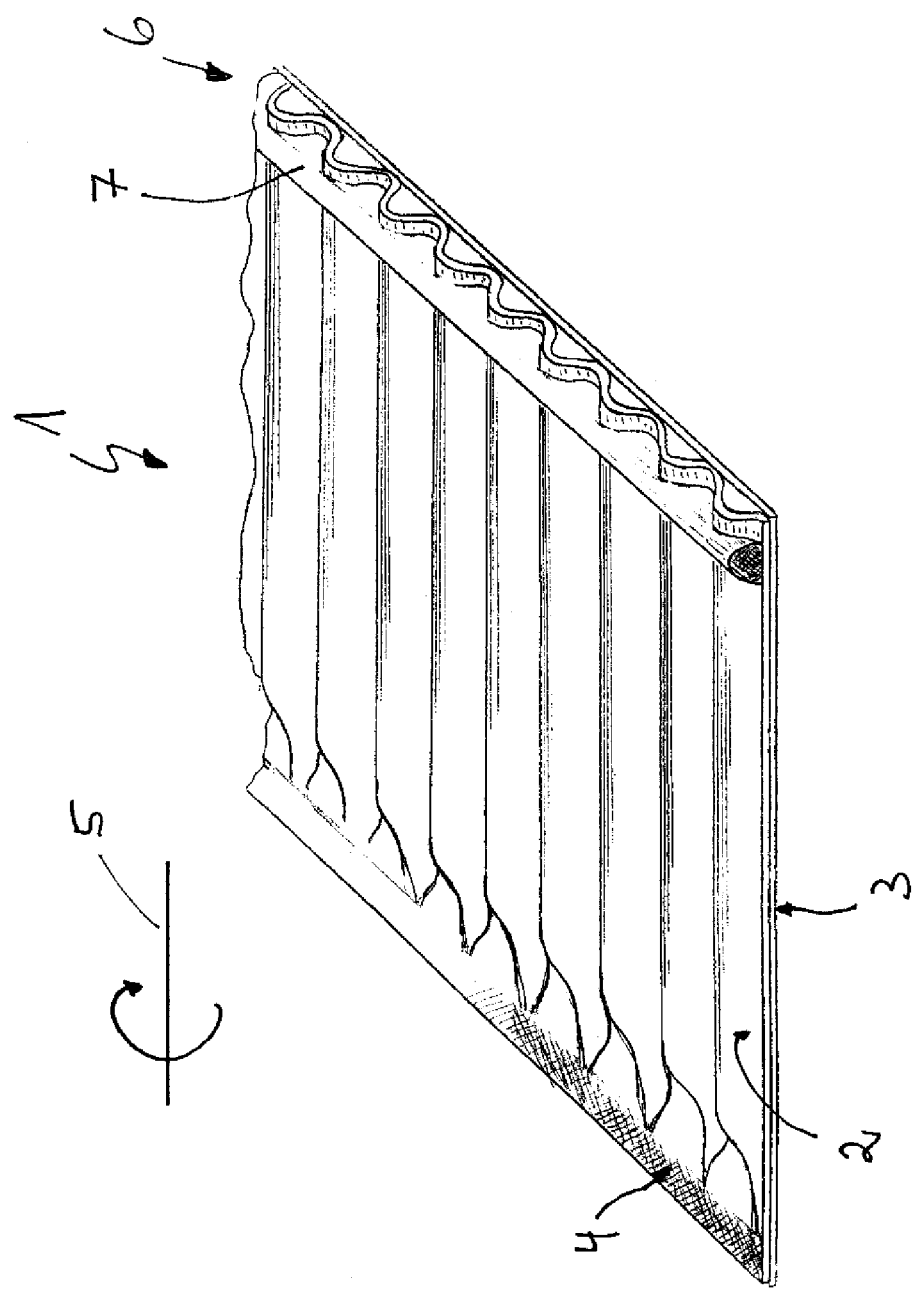

MULTI-LAYERED FILTER WEB

CROSS-REFERENCES TO RELATED APPLICATIONS

This application claims priority to German patent application DE 10 2008 029 480.2, filed on Jun. 20, 2008; and PCT/EP2009/057275, filed on Jun. 12, 2009, both of which are hereby incorporated by reference in their entirety.

TECHNICAL FIELD

The invention concerns a multi-layer filter web for a wound filter.

BACKGROUND

Multi-layer filter webs, which usually consist of a filter material containing fibres, are of sufficiently known art. The bonding of individual filter layers of the filter web thereby usually takes place via edgewise welding or the use of adhesive. Filter layers of this type, with individual filter layers adhered or welded to one another, can then in a further operation, for example, be wound up to form a wound filter. The bonding techniques that are deployed, that is to say in particular the above-cited use of adhesive and/or welding to bond the individual filter layers of the filter web, are complex in production terms, and thus expensive, and moreover often generate only unsatisfactory bonding between the individual layers of the filter web.

From DE 20 2005 019 910 U1 a generically similar filter web is of known art, in which the two filter layers are, however, bonded together in a form fit manner, for example, by means of overlapping and subsequent stamping, that is to say therefore, macroscopically.

SUMMARY

The invention is concerned with the problem of specifying an improved, or at least another, form of embodiment for a filter web of the generic type, which is distinguished in particular by an improved bonding of the individual filter layers of the filter web.

This problem is solved by means of a filter web with the characteristic features described hereinafter with advantageous and appropriate embodiments.

The invention is based on the general concept of matting together individual filter layers of the filter web in some regions, that is to say, of bonding them microscopically, and of bonding them together via at least one knurled edge, which at the same time is subjected to an ultrasound procedure. By means of the ultrasound method in particular with filter materials containing fibres, such as, for example, a filter paper known from the prior art, by a matting of the individual fibres of the filter material a very good bonding is achieved between individual filter layers. The matting of the two filter layers takes place both in the knurled region, and also in the areas of contact between the first and the second filter layer.

The bonding in the knurled region is secure and at the same time sealed, while the bonding on the corrugation troughs need not provide a seal with the plane filter layer, but is just to bond the two filter layers together.

The term "matting" should be understood to include also the term "splicing". "Micro-splicing"/"micro-matting" should preferably take place, in which individual fibres protrude into the opposing filter layer. Here the matting procedure can involve only a few fibres, or a multiplicity of fibres. Furthermore a matting procedure is possible in which exclusively fibres of the one filter layer enmesh with the other filter layer. Alternatively, however, fibres from both filter layers can also enmesh with the respectively adjacent filter layer, as a result of which a better bond of the filter layers with one another is achieved.

In a first variant the thickness of the filter layer(s), for example of a fleece, is reduced in the region of the matting. This signifies that at the contact points of the corrugated fleece with the plane fleece a lesser thickness is present than at the other points at which the corrugated fleece does not make contact with the plane fleece.

In accordance with an improved embodiment of the invention the fibres of the filter layers/fleeces are coated with a resin. The not yet hardened filter layers/fleeces are matted together. The holding forces are thereby generated in accordance with the first variant by the enmeshing fibres.

In a subsequent hardening of the filter layers/fleeces the resin coatings of the fibres are fused. In the subsequent solidification the resin coatings of the adjacent fibres bond together and thus form additional bonding forces. Thus the bond between the two filter layers/fleeces is additionally improved.

In a third variant fleeces made up of nano-fibres are bonded with the filter layers. Here a layer of nano-fibres, or of Melt-blown, with a thickness of a very few µm, is secured to the filter's filter layer/fleece. The fibres are interlocked and welded.

Of particular advantage thereby is that with an appropriate embodiment and/or design of a knurling roller generating the knurled edge, which at the same time transmits ultrasound vibrations onto the filter layers of the filter web that are to be bonded together, the ultrasound-bonded knurled edge in accordance with the invention can be manufactured in a single operation, as a result of which cost and time advantages can be realised. At the same time no further closure or bonding material, such as, for example, an adhesive and/or sealing material, is required for purposes of bonding the individual filter layers of the filter web, as a result of which additional costs can be saved. In particular with materials containing fibres, the ultrasound loading together with the knurled profile of the knurling rollers generates an interlocking and matting of the individual fibres of the filter layers that are to be bonded together, as a result of which these enter into a particular secure bond with one another.

Here the ultrasound-loaded knurling rollers can press the filter layers to be bonded against an anvil and cause a matting of the individual fibres during the rolling and knurling procedure.

Advantageously two filter layers are provided per filter web, of which a first filter layer is embodied as a corrugated sheet and a second filter layer as a plane sheet, and wherein the first filter layer, embodied as a corrugated sheet, is bonded, in particular is ultrasound-welded, with the second plane filter layer, at its corrugation minima or maxima facing towards the second filter layer and adjacent to the latter, in a linear or punctiform manner. A filter web of this type thus consists of a filter layer in the form of a corrugated sheet and a plane filter layer adjacent to the former, wherein the two filter layers are respectively bonded together, preferably ultrasound-welded, at their areas of contact in a linear or punctiform manner. Here the ultrasound welding also causes the individual fibres of the filter layers to interconnect, and thus enter into a secure bond with one another. Depending on the configuration of the knurling rollers the bonding regions between the individual filter layers can thereby be designed in a linear or punctiform manner. In a further advantageous form of embodiment of the solution in accordance with the invention the corrugated first filter layer has an adhesive bead parallel to the edge on its side edge opposite to the knurled edge, which is arranged on the side of the selected first filter layer facing away from the second and plane filter layer, and enables the filter web wound up into the form of a wound filter to be secured.

During the winding of the filter web into the form of a wound filter an adhesive bead thus bonds the first corrugated filter layer with the second plane filter layer and moreover secures the wound filter web in its final location. At the same time an adhesive bead of this type, which, for example, can also be designed as a sealing bead, enables the end faces of the wound filter to be sealed.

Further important features and advantages of the invention ensue from the dependent claims, from the drawing, and from the related description of the figures with the aid of the drawing.

It is to be understood that the above-cited features and those still to be elucidated in what follows can be applied not only in the combination specified in each case, but also in other combinations, or in isolation, without moving beyond the framework of the present invention.

BREIF DESCRIPTION OF THE DRAWING

A preferred example of embodiment of the invention is represented in the drawing, and is elucidated in the following description in more detail.

The single FIG. 1 shows a possible form of embodiment of a filter web in accordance with the invention.

DETAILED DESCRIPTION

Corresponding to FIG. 1 a multi-layer filter web 1, which is here designed as a two-layer filter web 1, has a first corrugated filter layer 2 and a second plane filter layer 3.

The corrugated first filter layer 2 is thereby designed in the form of a corrugated sheet, that is to say, with corrugations arranged parallel to one another. In accordance with FIG. 1 the individual filter layers 2 and 3 are bonded together on the left-hand edge of the filter web 1 via an ultrasound-welded knurled edge 4. In the region of the knurled edge 4 the corrugations of the corrugated first filter layer 2 are thereby smoothed out. The knurling on the knurled edge is indicated in FIG. 1 by light hatching.

Via the at least one knurled edge 4 in accordance with the invention a bonding of the two filter layers 2 and 3 can be achieved that is simple to manufacture in production terms, cost-effective, and at the same time very durable, in that during the knurling and simultaneous ultrasound loading adhesion, matting and/or interlocking of individual fibres of the filter layers 2, 3 takes place with fibres of the other filter layer 3, 2. The knurled edge 4 thus does not require further closure materials, such as adhesives, for example, so that a sealed and secure bonding can be manufactured between the filter layers 2 and 3 without additional materials.

As filter materials for the individual filter layers 2, 3 filter materials containing fibres come in particular into consideration, such as, for example, a filter paper with cellulose fibres. Filter materials containing plastic fibres are, needless to say, also conceivable. In addition to the knurled edge 4 the two filter layers 2 and 3 are bonded together, in particular are ultrasound-welded together, at common areas of contact. Areas of contact of this type can, for example, be designed as lines of contact, and extend along what are called the corrugation minima or maxima of the corrugated first filter layer 2.

The bonding of the two filter layers 2 and 3 is thus not just limited to the knurled edge 4, but is distributed over the whole filter web 1.

For the manufacture of a wound filter the filter web 1 in accordance with the invention can be wound up around an axis 5 that runs parallel to the corrugations of the corrugated first filter layer 2. In order to be able to hold the filter web 1 in the desired form after the winding procedure, the corrugated first filter layer 2 has on its side edge 6 opposite to the knurled edge 4 an adhesive bead 7 parallel to the edge, which is arranged on the side of the corrugated first filter layer 2 facing away from the second filter layer 3.

The adhesive seam 7 can thereby at the same time have a sealing material, so that a wound filter wound from the filter web 1 can be sealed on its end faces. A filter web 1 manufactured in this manner can in particular be deployed as an air intake filter for an internal combustion engine, wherein, however, deployment for other fluid filters, in particular liquid filters, is also conceivable.

The filter web 1 is manufactured such that the corrugated first filter layer 2 is bonded, in particular is ultrasound-welded, with the second filter layer 3 via its areas of contact, making contact with the second filter layer 3 in a linear or punctiform manner, and what is more in the same operation and thus in a process-optimised manner, in that both the edgewise knurling and ultrasound bonding together of the two filter layers 2 and 3 takes place.

The filter web 1 can thus be manufactured in a particularly rational and cost-effective manner.

For the manufacture of the wound filter, after the knurling and/or ultrasound bonding together of the two filter layers 2 and 3, the adhesive/sealing seam 7 mentioned in the previous paragraph is applied onto the side edge 6 and the filter web 1 is then wound up around the winding axis 5, wherein the corrugated first filter layer 2 should always be directed outwards during the winding procedure.

With the filter web 1 in accordance with the invention different numbers of individual filter layers 2, 3 can be bonded together in a simple and cost-effective manner in production terms, wherein by means of the ultrasound-bonded knurled edge 4 at the same time a sealed closure of the end faces can be manufactured between the two filter layers 2 and 3. in contrast to the previous bonding of a plurality of filter layers, in which an additional bonding material, in particular an adhesive material, was required, the filter web 1 in accordance with the invention does not require a bonding material of this type, which likewise contributes to the realisation of cost advantages.

Needless to say, the form of embodiment of the filter web 1 represented in accordance with FIG. 1 and described in the previous paragraphs is not limited to a two-layer filter web 1, so that filter webs 1 with more than two filter layers 2, 3 are to be covered by the invention.

The invention claimed is:

1. A method for the manufacture of a filter, comprising:
    matting together at least two filter layers at least in some regions;
    knurling the at least two filter layers together at one edge of the two filter layers to form a knurled edge that is sealed;
    bonding together the at least two filter layers at the knurled edge by a first ultrasound; and
    attaching an adhesive bead along a side edge of the first of the at least two filter layers, the side edge being opposite to the knurled edge that is sealed;
    wherein the knurling and the bonding of the at least two filter layers occur in a single operation; and wherein the filter is wound into a form of a wound filter web and the adhesive bead secures the wound filter web in its final location.

2. The method in accordance with Claim 1, further comprising bonding the at least two filter layers by a second ultrasound to areas of contact interfaces between the two filter layers in at least one of a linear and punctiform manner, wherein the first of the at least two filter layers is a corrugated first filter layer, and the second of the at least two filter layers is a plane second filter layer.

3. The method in accordance with Claim 1, wherein the knurling and the bonding of the at least two filter layers occur simultaneously in the single operation.

4. A filter prepared by a process comprising:
matting together at least two filter layers at least in some regions;
knurling the at least two filter layers together at one edge of the two filter layers to form a knurled edge that is sealed;
bonding together the at least two filter layers at the knurled edge by a first ultrasound; and
attaching an adhesive bead along a side edge of the first of the at least two filter layers, the side edge being opposite to the knurled edge that is sealed;
wherein the knurling and the bonding of the at least two filter layers occur in a single operation; and
wherein the filter is in a form of a wound filter web and the bead secures the wound filter web in its final location.

5. The filter prepared in accordance with the process of Claim 4, the process further comprising bonding the at least two filter layers by a second ultrasound to areas of contact interfaces between them in at least one of a linear and punctiform manner, wherein the first of the at least two filter layers is a corrugated first filter layer, and the second of the at least two filter layers is a plane second filter layer.

6. The filter prepared in accordance with the process of Claim 5, wherein the adhesive bead is on a side of the corrugated first filter layer facing away from the plane second filter layer to be securely wound to form a wound filter.

7. The filter prepared in accordance with the process of Claim 5, wherein the knurling and the bonding of the at least two filter layers occur simultaneously in the single operation.

8. A method for the manufacture of a filter, comprising:
matting together at least two filter layers at least in some regions;
knurling the at least two filter layers together at one edge of the two filter layers to form a knurled edge;
bonding together the at least two filter layers at the knurled edge by a first ultrasound; and
attaching a bead along a side edge of the first of the at least two filter layers, the side edge being opposite to the knurled edge that is sealed;
wherein the knurling and the bonding of the at least two filter layers occur in a single operation;
wherein the adhesive bead is on a side of the first of the at least two filter layers facing away from the second of the at least two filter layers, the filter is wound into the form of a wound filter, and the adhesive bead enables the filter to be securely wound to form the wound filter.

9. The method in accordance with claim 8, wherein the knurling and the bonding of the at least two filter layers occur in a single operation.

10. The method in accordance with Claim 9, wherein the knurling and the bonding of the at least two filter layers occur simultaneously in the single operation.

11. The method in accordance with Claim 8, further comprising bonding the at least two filter layers by a second ultrasound to areas of contact interfaces between them in at least one of a linear and punctiform manner, wherein the first of the at least two filter layers is a corrugated first filter layer, and the second of the at least two filter layers is a plane second filter layer.

\* \* \* \* \*